United States Patent

Yu et al.

(10) Patent No.: US 12,536,102 B2
(45) Date of Patent: Jan. 27, 2026

(54) PURPOSED DATA TRANSFER USING MULTIPLE CACHE SLOTS

(71) Applicant: Dell Products L.P., Round Rock, TX (US)

(72) Inventors: Rong Yu, West Roxbury, MA (US); Michael Scharland, Franklin, MA (US); Martin Feeney, Medway, MA (US); Mohammed Asher V T, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/329,707

(22) Filed: Jun. 6, 2023

(65) Prior Publication Data

US 2024/0411694 A1    Dec. 12, 2024

(51) Int. Cl.
*G06F 12/00* (2006.01)
*G06F 12/0811* (2016.01)
*G06F 3/06* (2006.01)
*G06F 12/0871* (2016.01)

(52) U.S. Cl.
CPC ........ *G06F 12/0811* (2013.01); *G06F 3/0608* (2013.01); *G06F 3/0656* (2013.01); *G06F 3/0661* (2013.01); *G06F 3/0688* (2013.01); *G06F 3/0689* (2013.01); *G06F 12/0871* (2013.01)

(58) Field of Classification Search
None
See application file for complete search history.

(56) References Cited

U.S. PATENT DOCUMENTS

| | | | |
|---|---|---|---|
| 10,789,168 B2 | 9/2020 | Fu et al. | |
| 10,795,814 B2 | 10/2020 | Nelson et al. | |
| 11,538,578 B1 * | 12/2022 | Accomazzi | G06F 16/957 |
| 11,599,461 B2 | 3/2023 | Scharland et al. | |
| 2015/0186051 A1 * | 7/2015 | Gurajada | G06F 3/0611 711/113 |
| 2024/0201888 A1 * | 6/2024 | Cariello | G06F 3/0608 |

FOREIGN PATENT DOCUMENTS

EP    1403757 A2 *    3/2004    ........... G06F 3/0601

* cited by examiner

*Primary Examiner* — Midys Rojas
(74) *Attorney, Agent, or Firm* — DALY, CROWLEY, MOFFORD & DURKEE, LLP

(57) ABSTRACT

An example methodology includes provisioning memory of a storage array with cache memory including a plurality of cache slots and reading data from the memory of the storage array into a first cache slot of the plurality of cache slots, wherein the data in the first cache slot is in a first data format, the first data format being the format of data in the memory of the storage array. The method also includes converting the data in the first cache to a second data format distinct from the first data format and placing the data in the second data format into a second cache slot of the plurality of cache slots.

17 Claims, 6 Drawing Sheets

PURPOSED DATA TRANSFER USING MULTIPLE CACHE SLOTS

BACKGROUND

A storage system may include a plurality of storage devices (e.g., storage arrays) to provide data storage to a plurality of nodes (e.g., hosts). The storage system may use volatile memory as a global cache to temporarily store data that has been transmitted/received by the storage system. When a host accesses (e.g., reads or writes) data that is not in the global cache, the data is fetched from the disk drive and copied into the global cache, ready for the next access. Subsequent accesses of the data are performed accessing the global cache without needing to access the disk drive. Eventually, when the data is no longer accessed, the data may be removed from the global cache to the disk drive to make room in the global cache for more active data.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes provisioning memory of a storage array with cache memory including a plurality of cache slots and reading data from the memory of the storage array into a first cache slot of the plurality of cache slots, wherein the data in the first cache slot is in a first data format, the first data format being the format of data in the memory of the storage array. The method also includes converting the data in the first cache to a second data format distinct from the first data format and placing the data in the second data format into a second cache slot of the plurality of cache slots.

In some embodiments, the memory of the storage array is a count key data (CKD) track.

In some embodiments, the first data format is a compressed format.

In some embodiments, the second data format is a native data format used within the storage array.

In some embodiments, the second data format is a host transfer ready format.

In some embodiments, the method also includes converting the data in the second cache slot to a third data format distinct from the first data format and the second data format.

In some embodiments, the third data format is a host transfer ready format.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including provisioning memory of a storage array with cache memory including a plurality of cache slots and reading data from the memory of the storage array into a first cache slot of the plurality of cache slots, wherein the data in the first cache slot is in a first data format, the first data format being the format of data in the memory of the storage array. The process also includes converting the data in the first cache to a second data format distinct from the first data format and placing the data in the second data format into a second cache slot of the plurality of cache slots.

According to another illustrative embodiment provided to illustrate the broader concepts described herein, a non-transitory machine-readable medium encodes instructions that when executed by one or more processors cause a process to be carried out, the process including provisioning memory of a storage array with cache memory including a plurality of cache slots and reading data from the memory of the storage array into a first cache slot of the plurality of cache slots, wherein the data in the first cache slot is in a first data format, the first data format being the format of data in the memory of the storage array. The process also includes converting the data in the first cache to a second data format distinct from the first data format and placing the data in the second data format into a second cache slot of the plurality of cache slots.

In accordance with another illustrative embodiment provided to illustrate the broader concepts, systems, and techniques described herein, a method includes writing data from a host into a first cache slot of a plurality of cache slots, wherein the data in the first cache slot is in a first data format, the first data format being a host transfer data format, converting the data in the first cache to a second data format distinct from the first data format, and placing the data in the second data format into a second cache slot of the plurality of cache slots.

In some embodiments, the second data format is a compressed format.

In some embodiments, the method also includes writing the data in the second data format from the second cache to a storage array.

In some embodiments, the second data format is a native data format used within the storage array.

In some embodiments, the method further includes converting the data in the second cache slot to a third data format distinct from the first data format and the second data format and placing the data in the third data format into a third cache slot of the plurality of cache slots.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including writing data from a host into a first cache slot of a plurality of cache slots, wherein the data in the first cache slot is in a first data format, the first data format being a host transfer data format, converting the data in the first cache to a second data format distinct from the first data format, and placing the data in the second data format into a second cache slot of the plurality of cache slots.

According to another illustrative embodiment provided to illustrate the broader concepts described herein, a non-transitory machine-readable medium encodes instructions that when executed by one or more processors cause a process to be carried out, the process including writing data from a host into a first cache slot of a plurality of cache slots, wherein the data in the first cache slot is in a first data format, the first data format being a host transfer data format, converting the data in the first cache to a second data format distinct from the first data format, and placing the data in the second data format into a second cache slot of the plurality of cache slots.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Data access is generally much easier with cache memory. However, the data in the cache may not be in the correct format. For example, data in a cache slot mapped to a count key data (CKD) track is stored in the track's native format with count, key, and data fields along with the data integrity field (DIF) after each block. When sending the data to a host, the count field and the DIF field need to be stripped off. This requires additional Scatter-Gather (SGL) processing, resulting in a slower transfer from the storage array to the host. As another example, for both local and remote replication, the data read from the storage array is first decompressed, transferred to the target array, and then compressed for storage within the target array, which can be inefficient and slow. In general, the data in the cache memory may be in a format that is inefficient in terms of computing resources.

Disclosed herein are concepts, structures, and techniques for using multiple cache slots in cache memory to hold data that is being provisioned in different data formats. Holding data in different formats in the cache slots enables faster and more efficient data transfer directly to/from the cache slots. Numerous configurations and variations will be apparent in light of this disclosure.

Figure 1:
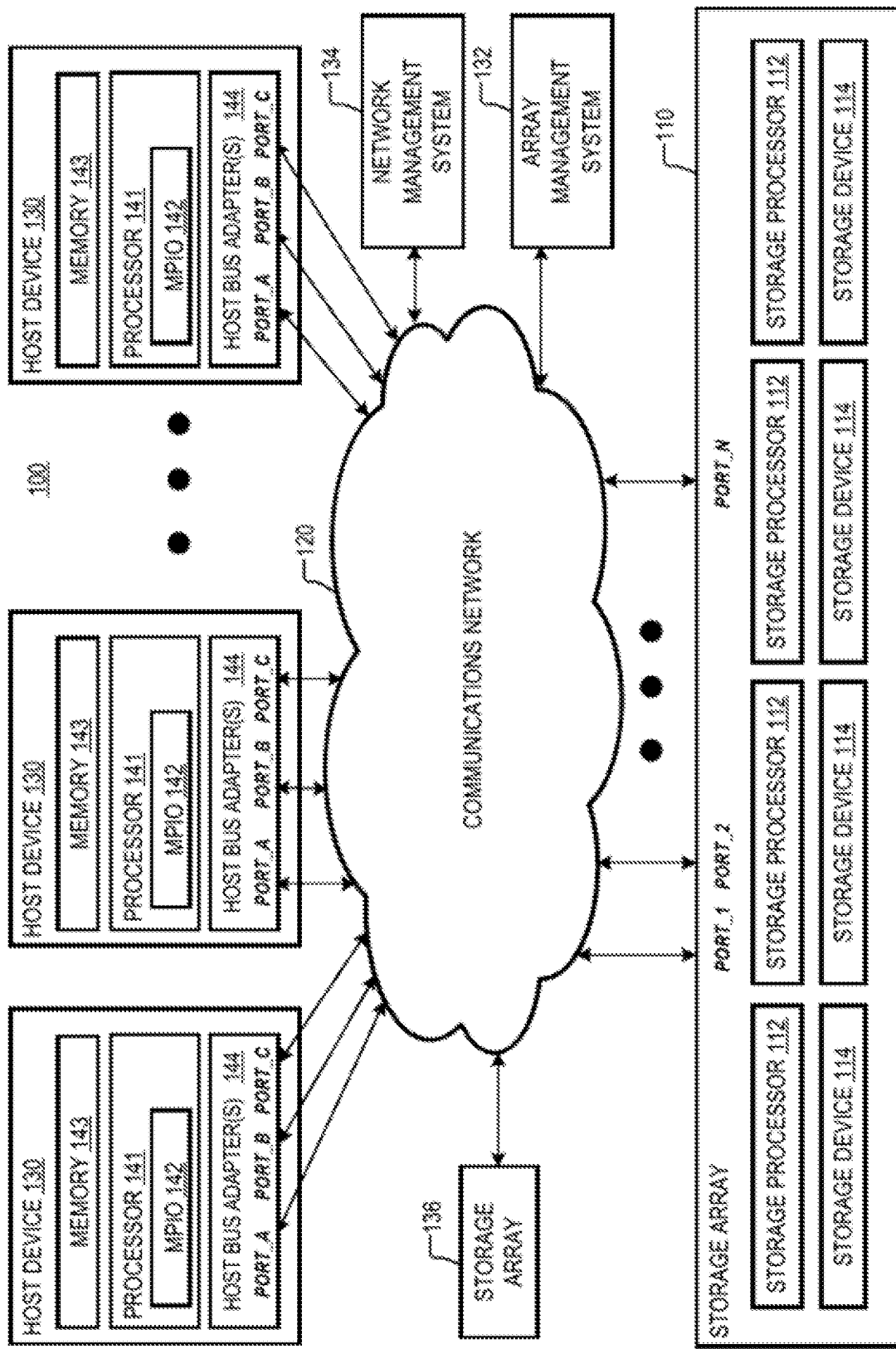
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 600 of FIG. 6. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120. storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 6:
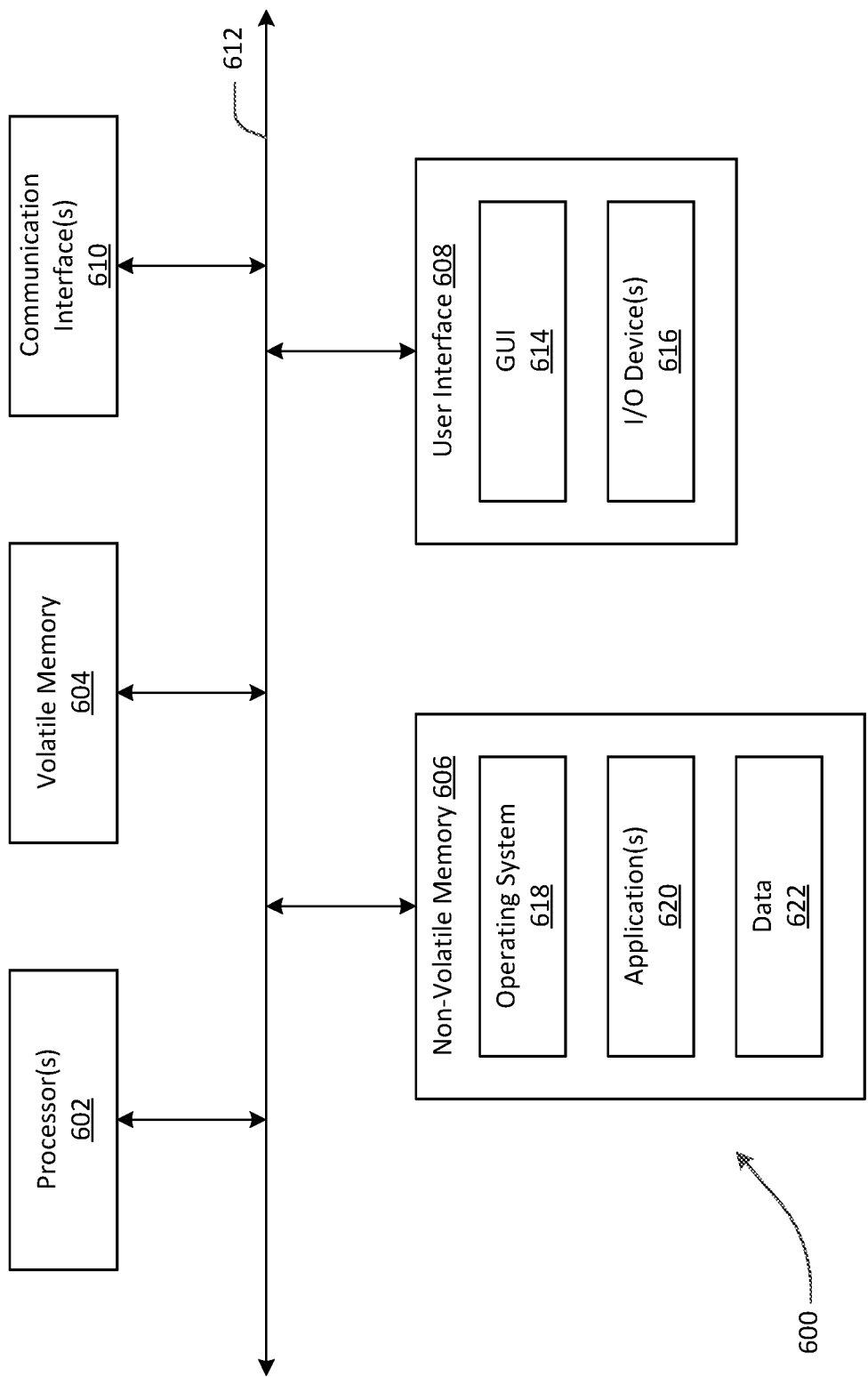
FIG. 6 is a block diagram illustrating selective components of an example computing device in which various aspects of the disclosure may be implemented, in accordance with an embodiment of the present disclosure.

Array management system 132 may include a computing device, such as computing device 600 of FIG. 6. Array management system 132 may be used by a system administrator to re-configure storage array 110, e.g., when degraded performance of storage array 110 is detected.

Network management system 134 may include a computing device, such as computing device 600 of FIG. 6. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
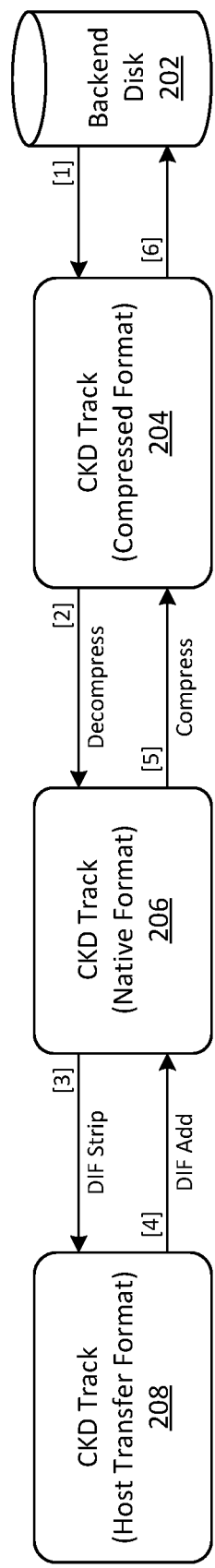
FIG. 2 is a diagram illustrating an example topology for storing data in different data formats in multiple cache slots with which memory of a storage array is provisioned, in accordance with an embodiment of the present disclosure.

Referring now to FIG. 2, shown is a diagram illustrating an example topology for storing data in different data formats in multiple cache slots with which memory of a storage array is provisioned, in accordance with an embodiment of the present disclosure. Such a topology can be understood as a process in which the three cache slots 204, 206, 208 being used to provision memory of a backend disk 202 hold data from backend disk 202 in different data formats. In the example of FIG. 2, it is assumed that a CKD track in backend disk 202 is being provisioned.

As can be seen in FIG. 2, a CKD track in backend disk 202 can be read directly [1] into cache slot 204. The data within cache slot 204 is in compressed format which is the format of the data on the CKD track in backend disk 202. The compressed data format may be used while writing to the CKD track in backend disk 202 or when compressed CKD track data is read from backend disk 202. The data in the compressed format in cache slot 204 can then be converted to the CKD track native format and placed into [2] cache slot 206. For example, the compressed data may be converted to the CKD track native format by decompressing the compressed data. The data in the CKD track format in cache slot 206 can then be converted to a host transfer format and placed into [3] cache slot 208. For example, the CKD track native format data may be converted to the host transfer format by stripping (e.g., removing) the DIF field. In some embodiments, a cyclic redundancy check (CRC) may be included after each record instead of each block to provide data protection. It is appreciated that supporting different data formats in each cache slot 204, 206, 208 used to provision the CKD track provides numerous technical advantages. For example, for a read hit, the data transfer from cache slot 208 to the host performing the read can significantly improve the host read response performance (e.g., read response times) since reading the data in the host transfer format directly from cache slot 208 requires less SGL transfers. This also provides the advantage of saving central processing unit (CPU) cycles on the host adapter. Another technical advantage is that keeping data in the compressed format in cache slot 204 allows for writing directly from cache slot 204 to backend disk 202, as well as for compression verification.

Continuing the example of FIG. 2, the data in cache slot 208 may be destaged. For example, the data in cache slot 208 may be destaged subsequent to the host writing data in the host transfer format directly into cache slot 208. To destage the data in cache slot 208, the data in the host transfer format in cache slot 208 can be converted to CKD track native format and placed into [4] cache slot 206. For example, the host transfer format data may be converted to the CKD track native format by adding the DIF field. The data in the CKD track native format in cache slot 206 can then be converted to the compressed format and placed into [5] cache slot 204. For example, the CKD track native format data may be converted to the compressed format by compressing the CKD track native format data. The data in the compressed format in cache slot 204 can then be written directly [6] to the CKD track in backend disk 202.

Figure 3:
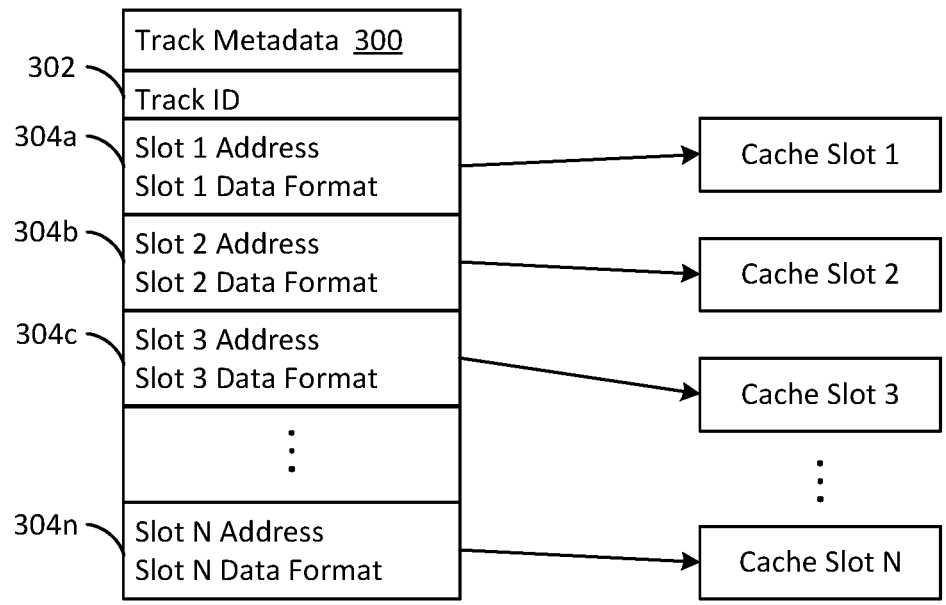
FIG. 3 is a block diagram illustrating multiple cache slots with which memory of a storage array is provisioned, in accordance with an embodiment of the present disclosure.

FIG. 3 is a block diagram illustrating multiple cache slots with which memory of a storage array is provisioned, in accordance with an embodiment of the present disclosure. For example, tracks in a storage array may be provisioned with cache memory including multiple cache slots that store data from the storage array in different data formats. In some embodiments, information about the cache slots with which a track of the storage array is provisioned may be maintained in a track metadata structure 300. Track metadata structure 300 can include a track ID record 302 and slot records 304a-304n (304 generally). Track ID record 302 can indicate (identify) the track that is being provisioned with the cache slots whose information is included in track metadata structure 300. Slot record 304 can indicate the location (e.g., address) of a cache slot in the cache memory and a data format designated for the cache slot. For instance, in the example of FIG. 3, slot record 304a can indicate the location of cache slot 1 and the format of the data held (e.g., stored) in cache slot 1, slot record 304b can indicate the location of cache slot 2 and the format of the data held in cache slot 2, slot record 304c can indicate the location of cache slot 3 and the format of the data held in cache slot 3, and slot record 304n can indicate the location of cache slot N and the format of the data held in cache slot N. The number of slot records 302 shown is merely illustrative and may vary depending on the number of cache slots with which a track in the storage array is provisioned.

Figure 4:
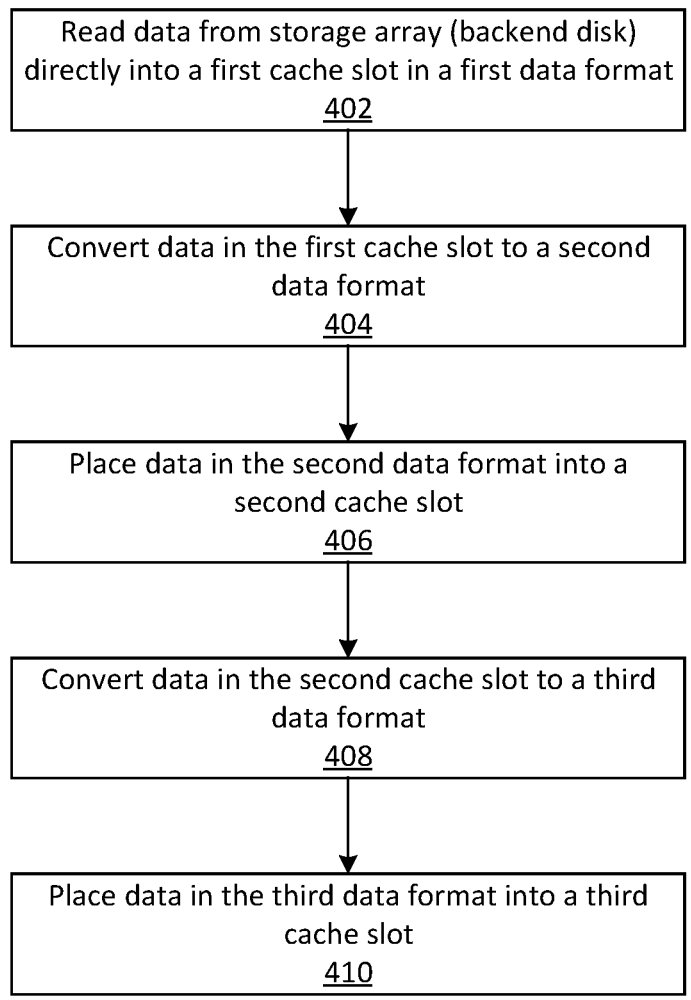
FIG. 4 is a flow diagram of an example process for processing a read miss of a storage array provisioned using multiple cache slots, in accordance with an embodiment of the present disclosure.

FIG. 4 is a flow diagram of an example process 400 for processing a read miss of a storage array provisioned using multiple cache slots, in accordance with an embodiment of the present disclosure. Illustrative process 400 may be implemented, for example, within system 100 of FIG. 1. In more detail, process 400 may be performed, for example, in whole or in part by storage processor 112 and/or other components of storage array 110 described with respect to FIG. 1. For purposes of this discussion, it is assumed that the storage array's memory is provisioned using three cache slots.

With reference to process 400 of FIG. 4, at 402, data from the memory of the storage array (e.g., data from the backend disk) may be read directly into a first cache slot. The first cache slot may be one of three cache slots that is being used to provision the memory of the storage array. The data read from the storage array may be placed into the first cache slot in a first data format which is the format in which the data is read from the memory of the storage array. For example, if the data in the memory of the storage array is read in a compressed format, the data may be placed into the first cache slot in the same compressed format (i.e., compressed data format). Placing the data in the first cache slot in the data format in which the data is read from the storage array enables the data in the first cache slot to be written directly from the first cache slot to the memory of the storage array without having to transform or convert the data into the format of the storage array.

At 404, the data in the first cache slot may be converted to a second data format. The second data format may be distinct (i.e., different) than the first data format of the data in the first cache slot. For example, the data in the first data format may be converted to a different data format that is more efficient for a purposed use of the data from the cache. In other words, the data in the first data format may be converted to another data format in which the data in that other data format can be used directly from a cache slot and, thus, more efficiently used. Continuing the example from 402, the data in the compressed format in the first cache slot may be converted to a native storage array format (e.g., converted to a native data format used within the storage array).

At 406, the data in the second data format may be placed into a second cache slot that is different from the first cache slot. The second cache slot may be one of three cache slots that is being used to provision the memory of the storage array. As mentioned previously, placing the data in the second data format into the second cache slot allows for the purposed use of the data in the second data format directly from the second cache slot. Continuing the above example from 404, the data in the native storage array format may be placed into the second cache slot. The data in the native storage array format in the second cache slot can then be used directly from the second cache slot for tasks, such as local replication and remote replication, among others, which utilize data in the native storage array format.

At 408, the data in the second cache slot may be converted to a third data format. The third data format may be distinct from (i.e., different) than the first data format of the data in the first cache slot and the second data format of the data in the second cache slot. For example, the data in the second data format may be converted to still another different data format that is more efficient for another purposed use of the data from the cache. Continuing the example from 406, the data in the native storage array format in the second cache slot may be converted to a host transfer ready format (e.g., converted to a data format used to transfer data to a host).

At 410, the data in the third data format may be placed into a third cache slot that is different from the first cache slot and the second cache slot. The third cache slot may be one of three cache slots that is being used to provision the memory of the storage array. As mentioned previously, placing the data in the third data format into the third cache slot allows for the purposed use of the data in the third data format directly from the third cache slot. Continuing the above example from 408, the data in the host transfer ready format may be placed into the third cache slot. The data in the host transfer ready format in the third cache slot can then be transferred directly to a host which receives (e.g., transfers) data in that data format (e.g., transferred directly to the host which accesses data from the storage array in the third data format). Note that using the third cache slot to hold data in host transfer ready format enables data that is in the host transfer ready format to be placed directly to the third cache slot (e.g., the host may directly write data in the host transfer format to the third cache slot).

Figure 5:
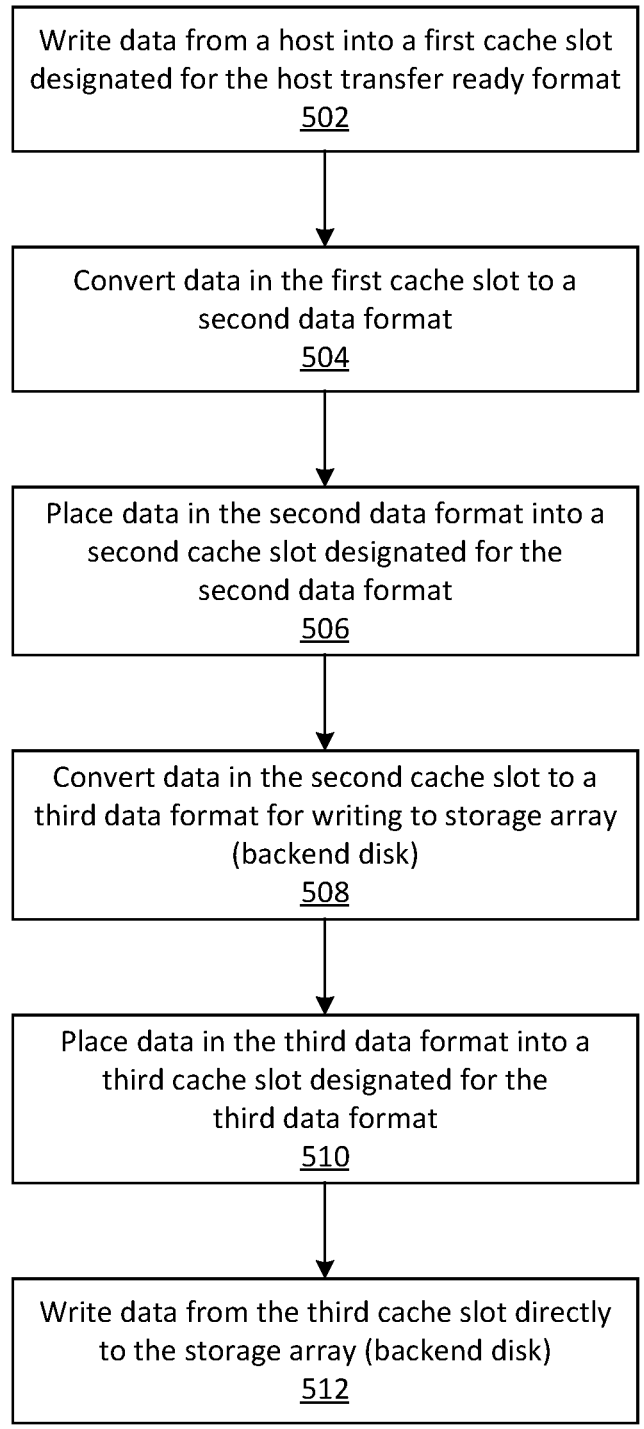
FIG. 5 is a flow diagram of an example process for processing a write to a storage array provisioned using multiple cache slots, in accordance with an embodiment of the present disclosure.

FIG. 5 is a flow diagram of an example process 500 for processing a write to a storage array provisioned using multiple cache slots, in accordance with an embodiment of the present disclosure. Illustrative process 500 may be implemented, for example, within system 100 of FIG. 1. In more detail, process 500 may be performed, for example, in whole or in part by storage processor 112 and/or other components of storage array 110 described with respect to FIG. 1. For purposes of this discussion, it is assumed that the storage array's memory is provisioned using three cache slots.

With reference to process 500 of FIG. 5, at 502, data from a host may be written into a first cache slot designated for the host transfer ready format. The first cache slot may be one of three cache slots that is being used to provision the memory of the storage array. For example, the host may write the data in host transfer format directly into the first cache slot designated for the host transfer format.

At 504, the data in the first cache slot may be converted to a second data format. For example, to destage the data from the first cache slot, the data in the host transfer format in the first cache slot may be converted to a second data format, such as a native storage array format, that is used within the storage array.

At 506, the data in the second data format may be placed into a second cache slot designated for the second data format. The second cache slot may be one of three cache slots that is being used to provision the memory of the storage array. Continuing the above example from 504, to destage the data, the data in the native storage array format may then be placed into the second cache slot designated for the native storage array format.

At 508, the data in the second cache slot may be converted to a third data format. For example, the data in the second cache slot may be converted to a data format that is used for storing data within the storage array. Continuing the above example from 506, assuming the storage array stores data in a compressed format, the data in the native storage array format in the second cache slot may be converted to a compressed format.

At 510, the data in the third data format may be placed into a third cache slot designated for the third data format. The third cache slot may be one of three cache slots that is being used to provision the memory of the storage array. Note that the third cache slot may be the cache slot used to directly place data read from the memory of the storage array. Continuing the above example from 508, to destage the data, the data in the compressed format may then be placed into the third cache slot designated for the compressed format.

At 512, the data from the third cache slot may be written directly to the storage array (e.g., backend disk). Continuing the above example from 510, to destage the data to the storage array, the data in the compressed format in the third cache slot may be written directly to memory in the storage array.

FIG. 6 is a block diagram illustrating selective components of an example computing device 600 in which various aspects of the disclosure may be implemented, in accordance with an embodiment of the present disclosure. For example, illustrative computing device 600 can perform all or part of the processes described herein. As shown, computing device 600 includes one or more processors 602, a volatile memory 604 (e.g., random access memory (RAM)), a non-volatile memory 606, a user interface (UI) 608, one or more communications interfaces 610, and a communications bus 612.

Non-volatile memory 606 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 608 may include a graphical user interface (GUI) 614 (e.g., a touchscreen, a display, etc.) and one or more input/output (I/O) devices 616 (e.g., a mouse, a keyboard, a microphone, one or more speakers, one or more cameras, one or more biometric scanners, one or more environmental sensors, and one or more accelerometers, etc.).

Non-volatile memory 606 stores an operating system 618, one or more applications 620, and data 622 such that, for example, computer instructions of operating system 618 and/or applications 620 are executed by processor(s) 602 out of volatile memory 604. In one example, computer instructions of operating system 618 and/or applications 620 are executed by processor(s) 602 out of volatile memory 604 to perform all or part of the processes described herein (e.g., processes illustrated and described with reference to FIGS. 1 through 5). In some embodiments, volatile memory 604 may include one or more types of RAM and/or a cache memory that may offer a faster response time than a main memory. Data may be entered using an input device of GUI 614 or received from I/O device(s) 616. Various elements of computing device 600 may communicate via communications bus 612.

The illustrated computing device 600 is shown merely as an illustrative client device or server and may be implemented by any computing or processing environment with any type of machine or set of machines that may have suitable hardware and/or software capable of operating as described herein.

Processor(s) 602 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUS), microcontrollers, field programmable gate arrays (FPGAs), programmable logic arrays (PLAs), multi-core processors, or general-purpose computers with associated memory.

Processor 602 may be analog, digital, or mixed signal. In some embodiments, processor 602 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 610 may include one or more interfaces to enable computing device 600 to access a computer network such as a Local Area Network (LAN), a Wide Area Network (WAN), a Personal Area Network (PAN), or the Internet through a variety of wired and/or wireless connections, including cellular connections.

In described embodiments, computing device 600 may execute an application on behalf of a user of a client device. For example, computing device 600 may execute one or more virtual machines managed by a hypervisor. Each virtual machine may provide an execution session within which applications execute on behalf of a user or a client device, such as a hosted desktop session. Computing device 600 may also execute a terminal services session to provide a hosted desktop environment. Computing device 600 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
    provisioning memory of a storage array with cache memory including a plurality of cache slots;
    reading data from the memory of the storage array into a first cache slot of the plurality of cache slots, wherein the data in the first cache slot is in a first data format, the first data format being a format of data in the memory of the storage array;
    converting the data in the first cache slot to a second data format distinct from the first data format;
    placing the data in the second data format into a second cache slot of the plurality of cache slots;
    converting the data in the second cache slot to a third data format distinct from the first data format and the second data format; and
    placing the data in the third data format into a third cache slot of the plurality of cache slots.

2. The method of claim 1, wherein the memory of the storage array is a count key data (CKD) track.

3. The method of claim 1, wherein the first data format is a compressed format.

4. The method of claim 1, wherein the second data format is a native data format used within the storage array.

5. The method of claim 1, wherein the second data format is a host transfer ready format.

6. The method of claim 1, wherein the third data format is a host transfer ready format.

7. The method of claim 6, further comprising sending the data in the third data format in the third cache slot to a host.

8. A system comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
    provisioning memory of a storage array with cache memory including a plurality of cache slots;
    reading data from the memory of the storage array into a first cache slot of the plurality of cache slots, wherein the data in the first cache slot is in a first data format, the first data format being a format of data in the memory of the storage array;
    converting the data in the first cache slot to a second data format distinct from the first data format;
    placing the data in the second data format into a second cache slot of the plurality of cache slots;
    converting the data in the second cache slot to a third data format distinct from the first data format and the second data format; and
    placing the data in the third data format into a third cache slot of the plurality of cache slots.

9. The system of claim 8, wherein the memory of the storage array is a count key data (CKD) track.

10. The system of claim 8, wherein the first data format is a compressed format.

11. The system of claim 8, wherein the second data format is a native data format used within the storage array.

12. The system of claim 8, wherein the second data format is a host transfer ready format.

13. The system of claim 8, wherein the third data format is a host transfer ready format.

14. A method comprising:
writing data from a host into a first cache slot of a plurality of cache slots, wherein the data in the first cache slot is in a first data format, the first data format being a host transfer data format;
converting the data in the first cache slot to a second data format distinct from the first data format; and
placing the data in the second data format into a second cache slot of the plurality of cache slots;
converting the data in the second cache slot to a third data format distinct from the first data format and the second data format; and
placing the data in the third data format into a third cache slot of the plurality of cache slots.

15. The method of claim 14, wherein the second data format is a compressed format.

16. The method of claim 15, further comprising writing the data in the second data format from the second cache slot to a storage array.

17. The method of claim 16, wherein the second data format is a native data format used within the storage array.

* * * * *